(12) United States Patent
Kawachiya et al.

(10) Patent No.: US 10,984,014 B2
(45) Date of Patent: *Apr. 20, 2021

(54) INTEGRATING MULTIPLE DISTRIBUTED DATA PROCESSING SERVERS WITH DIFFERENT DATA PARTITIONING AND ROUTING MECHANISMS, RESOURCE SHARING POLICIES AND LIFECYCLES INTO A SINGLE PROCESS

(71) Applicant: INTERNATIONAL BUSINESS MACHINES CORPORATION, Armonk, NY (US)

(72) Inventors: Kiyokuni Kawachiya, Kanagawa (JP); Yasushi Negishi, Tokyo (JP); Mikio Takeuchi, Kanagawa (JP); Gaku Yamamoto, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/781,992

(22) Filed: Feb. 4, 2020

(65) Prior Publication Data

US 2020/0174848 A1 Jun. 4, 2020

Related U.S. Application Data

(63) Continuation of application No. 15/865,750, filed on Jan. 9, 2018, now Pat. No. 10,613,911.

(51) Int. Cl.
*G06F 16/25* (2019.01)
*G06F 9/50* (2006.01)
*H04L 12/24* (2006.01)
*H04L 29/06* (2006.01)
*H04L 12/701* (2013.01)
*H04L 29/08* (2006.01)
*G06Q 10/10* (2012.01)

(52) U.S. Cl.
CPC .......... *G06F 16/258* (2019.01); *G06F 9/5077* (2013.01); *G06F 9/5088* (2013.01); (Continued)

(58) Field of Classification Search
CPC .... G06F 9/5088; G06F 9/5077; G06F 16/258; H04L 41/0893; H04L 45/00; H04L 65/60; (Continued)

(56) References Cited

U.S. PATENT DOCUMENTS 10,628,422 B2 * 4/2020 Baby ..................... G06F 16/27
10,691,716 B2 * 6/2020 Theimer ............... G06F 16/258
(Continued)

OTHER PUBLICATIONS

List of IBM Patents or Patent Applications Treated as Related dated Feb. 4, 2020, 2 pages.
(Continued)

*Primary Examiner* — Jacob D Dascomb
(74) *Attorney, Agent, or Firm* — Tutunjian & Bitetto, P.C.; Randall Bluestone (57) ABSTRACT

A method is provided for consistent data processing by first and second distributed processing systems having different data partitioning and routing mechanisms such that the first system is without states and the second system is with states. The method includes dividing data in each system into a same number of partitions based on a same key and a same hash function. The method includes mapping partitions between the systems in a one-to-one mapping. The mapping step includes calculating a partition ID based on the hash function and a total number of partitions, and dynamically mapping a partition in the first system to a partition in the second system, responsive to the partition in the first system being unmapped to the partition in the second system.

20 Claims, 5 Drawing Sheets

(52) U.S. Cl.
CPC .......... *H04L 41/0893* (2013.01); *H04L 45/00* (2013.01); *H04L 65/60* (2013.01); *H04L 65/605* (2013.01); *H04L 67/10* (2013.01); *G06Q 10/107* (2013.01); H04L 29/06 (2013.01)

(58) Field of Classification Search
CPC ....... H04L 65/605; H04L 67/10; H04L 29/06; G06Q 10/107
See application file for complete search history.

(56) References Cited

U.S. PATENT DOCUMENTS

| | | |
|---|---|---|
| 2004/0205179 A1 | 10/2004 | Hunt et al. |
| 2009/0133018 A1 | 5/2009 | Kaneki |
| 2015/0373012 A1 | 12/2015 | Bartz et al. |
| 2016/0182614 A1 | 6/2016 | Udupi et al. |
| 2017/0075693 A1 | 3/2017 | Bishop et al. |
| 2019/0220450 A1* | 7/2019 | Hu ........................ G06F 16/278 |

OTHER PUBLICATIONS

Mell et al. "The NIST Definition of Cloud Computing", NIST Special Publication 800-145, 2011, 7 pages.

Kirillov, Data Processing Platforms Architectures with SMACK: Spark, Mesos, Akka, Cassandra and Kafka, Big Data AW Meetup, Sep. 2015, 15 pages.

Rajiv, "Storm and Kafka Together: A Real-time Data Refinery", hortonworks.com, Feb. 2015, 4 pages.

* cited by examiner

INTEGRATING MULTIPLE DISTRIBUTED DATA PROCESSING SERVERS WITH DIFFERENT DATA PARTITIONING AND ROUTING MECHANISMS, RESOURCE SHARING POLICIES AND LIFECYCLES INTO A SINGLE PROCESS

BACKGROUND

Technical Field

The present invention relates generally to information processing and, in particular, to integrating multiple distributed data processing servers with different data partitioning and routing mechanisms, resource sharing policies and lifecycles into a single process.

Description of the Related Art

A new stateful streaming data processing engine is being developed for IBM Watson® Internet of Things for Automotive (IoT4A) with Apache Spark®, Apache Kafka®, and the IBM Agent Framework for DataGrid (AFDG). Spark® is a large scale distributed data processing system. Kafka® is a publish/subscribe based distributed messaging platform. AFDG is an agent based real time distributed data processing system.

Current IoT4A already integrates AFDG and many of its applications are written with AFDG. As a new member of IoT4A family, the new stateful streaming data processing engine is expected to work with the existing applications nicely.

The new stateful streaming data processing engine also needs to support fast access to local data partitions. However, the use of an external data store cannot meet the performance requirement.

Moreover, the preceding involves different routing mechanisms. For example, Spark® Streaming integration for Kafka® supports Kafka® partition based routing, whereas AFDG supports AFDG region based routing, thus being inconsistent.

Also, the preceding (Spark® and AFDG) is designed as standalone servers. While it is desirable to run Spark® and AFDG as a single process for fast data access, both Spark® workers and AFDG servers are designed as standalone servers.

Additionally, their lifecycles are also different. Hence, there is a need for a way to integrate multiple distributed data processing systems with different data partitioning and routing mechanisms, resource sharing policies and lifecycles into a single process.

SUMMARY

According to an aspect of the present invention, a computer-implemented method is provided for enabling consistent data processing by first and second distributed processing systems having different data partitioning and routing mechanisms such that the first distributed processing system is without states and the second distributed processing system is with states. The method includes dividing data in each of the distributed processing systems into a same number of partitions based on a same key and a same hash function. The method further includes mapping partitions between the distributed processing systems in a one-to-one mapping. The mapping step includes calculating a partition ID based on the hash function and a total number of partitions, and dynamically mapping a partition in the first distributed processing system to a partition in the second distributed processing system, responsive to the partition in the first distributed processing system being unmapped to the partition in the second distributed processing system.

According to another aspect of the present invention, a computer program product is provided for enabling consistent data processing by first and second distributed processing systems having different data partitioning and routing mechanisms such that the first distributed processing system is without states and the second distributed processing system is with states. The computer program product includes a non-transitory computer readable storage medium having program instructions embodied therewith. The program instructions are executable by a computer to cause the computer to perform a method. The method includes dividing data in each of the distributed processing systems into a same number of partitions based on a same key and a same hash function. The method further includes mapping partitions between the distributed processing systems in a one-to-one mapping. The mapping step includes calculating a partition ID based on the hash function and a total number of partitions, and dynamically mapping a partition in the first distributed processing system to a partition in the second distributed processing system, responsive to the partition in the first distributed processing system being unmapped to the partition in the second distributed processing system.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to integrating multiple distributed data processing servers with different data partitioning and routing mechanisms, resource sharing policies and lifecycles into a single process.

In an embodiment, the present invention provides consistent data processing for multiple distributed data processing systems having different data partitioning and routing mechanisms, by dynamically mapping their data partitions (or regions).

In an embodiment, multiple servers are enabled to have different resource sharing policies and lifecycles integrated into a single process, by devising the same at the time of operation.

Figure 1:
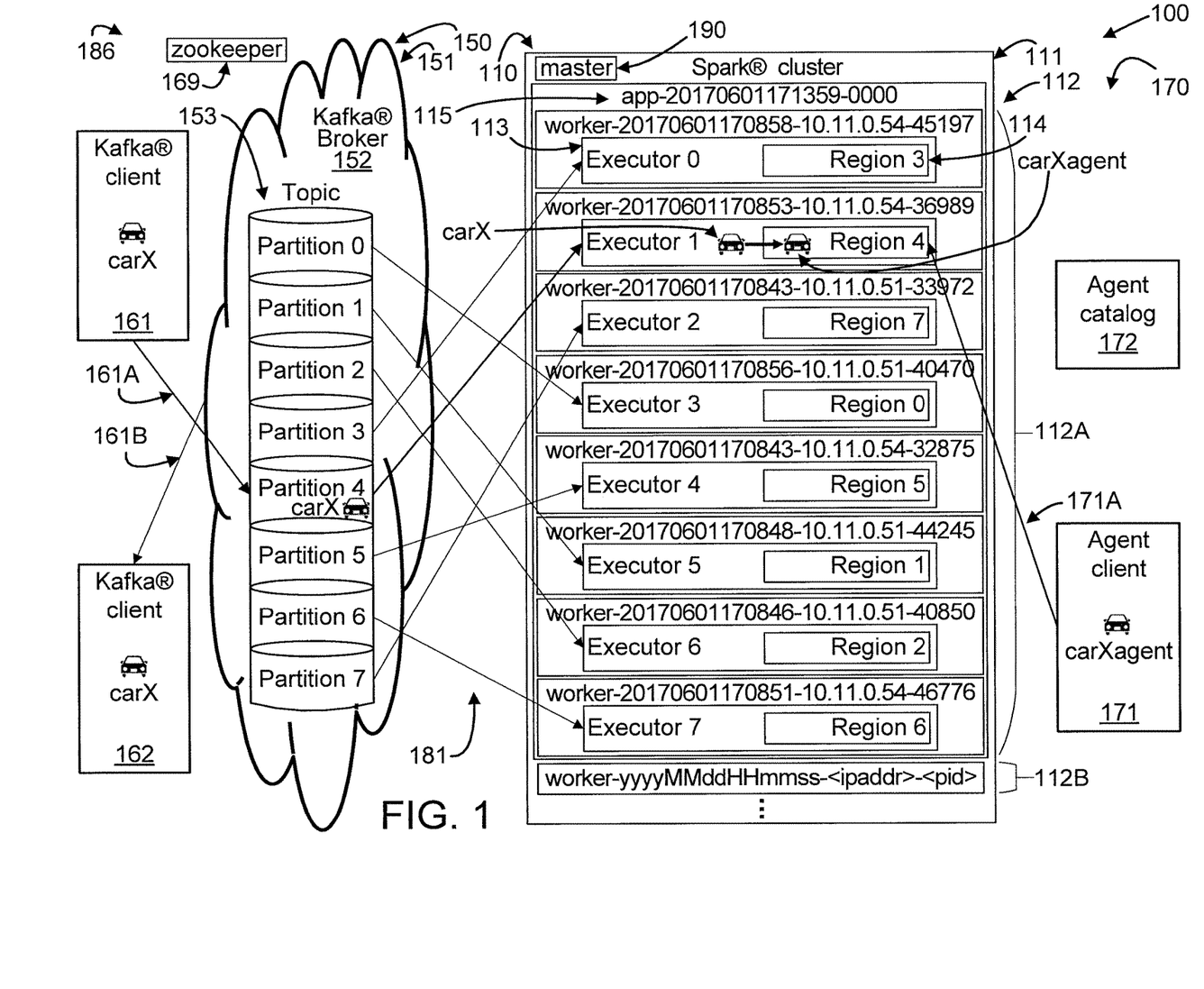
FIG. 1 is a block diagram showing an exemplary environment to which the present invention can be applied, in accordance with an embodiment of the present invention.

FIG. 1 is a block diagram showing an exemplary environment 100 to which the present invention can be applied, in accordance with an embodiment of the present invention. The environment 100 is representative of a distributed computer environment to which the present invention can be applied. The elements shown relative to FIG. 1 are set forth for the sake of illustration. However, it is to be appreciated that the present invention can be applied to other configurations and other operational environments as readily contemplated by one of ordinary skill in the art given the teachings of the present invention provided herein, while maintaining the spirit of the present invention.

The environment 100 includes a Spark® distributed data processing system (hereinafter interchangeably referred to as the "Spark® system" in short) 110, a Kafka® distributed messaging platform 150, and the IBM Agent Framework for DataGrid (AFDG) 170.

The elements 110, 150, and 170 can be configured to implement a stateful streaming data processing engine for IoT4A. In such a case, the Spark® distributed data processing system 110 can be used as a streaming processing engine for the stateful streaming processing engine. The Kafka® distributed messaging platform 150 can be used as a dynamic routing mechanism for the stateful streaming processing engine. The AFDG 170 can be used as an in-memory data store for the stateful streaming processing engine. The Spark® distributed data processing system 110 and the Kafka® distributed messaging platform 150 can be considered to form a Spark Streaming integration for Kafka® distributed data processing system 186.

While a Spark® distributed data processing system, a Kafka® distributed messaging platform, and an AFDG are described herein for the sake of illustration, it is to be appreciated that the present invention is not limited to solely the preceding types of distributed systems and distributed platforms and, thus, other types of distributed systems and distributed platforms can also be used in accordance with the teachings of the present invention, while maintaining the spirit of the present invention. For example, other embodiments of the present invention can involve at least one distributed data processing system without states (similar to Spark® Streaming integration for Kafka®), while at least another distributed data processing system is with states (similar to AFDG). These and other system types to which the present invention can be applied are readily appreciated by one of ordinary skill in the art, given the teachings of the present invention provided herein.

The Spark® distributed data processing system 110 includes a Spark® cluster 111. A master server 190 is part of the Spark cluster 111. The Spark cluster 111 has a set of worker processes 112 connected to the master 190. The set of worker processes 112 includes used worker processes 112A and unused worker processes 112B. In an embodiment, each of the used worker processes 112A has a single executor thread 113 and a region (which may also be interchangeably referred to as a "partition") 114. The used worker processes 112A are being currently used to execute an application 115. The executors 113 are threads that run computations for the application 115. The regions 114 store data for the application 115. A Spark® application (e.g., application 115) runs as a set of worker processes (e.g., used worker processes 112A) on a Spark® cluster (e.g., Spark® cluster 111). A Spark® application includes a driver program and executors (e.g., executors 113). A task is a unit of work sent to an executor 113.

The Kafka® distributed messaging platform 150 includes a Kafka® cluster 151 having a Kafka broker 152. The Kafka® cluster 151 stores streams of records in categories called topics. Each topic is stored in a set of partitions 153. Each record consists of a key, a value, and a timestamp. The Kafka® broker 152 is used to replicate messages. Kafka® includes the following four major APIs:

(1) Producer API—permits the applications to publish streams of records;

(2) Consumer API—permits the application to subscribe to the topics and processes the stream of records.

(3) Streams API—converts the input streams to output and produces the result.

(4) Connector API—executes the reusable producer and consumer APIs that can link the topics to the existing applications.

The Kafka® distributed messaging platform 150 uses Apache Zookeeper 169 for, for example, coordination between consumers.

The Kafka® client 161 sends the following message 161A to the Kafka® broker 152:

Producer.send(carX,partitionID), where partitionID=hash (X) % # partitions.

The Kafka® client 162 sends the following message 162A to the Kafka® broker 152:

Consumer.subscribe (topic).

The AFDG 170 includes an agent catalog 172 and regions 114.

The agent client 171 sends a message 171A to a region (e.g., Region 4) of the Spark cluster as follows:

sendMessage(carXagent,regionID), where regionID=hash(X) % # regions).

The agent client 171 can be implemented by one or more respective servers.

The agent catalog 172 stores agent directory information. The agent catalog 172 can be implemented by one or more respective servers.

In the context of FIG. 1, the partitions 153 can be considered to correspond to the Spark Streaming integration for Kafka® distributed data processing system 186, while the regions 114 can be considered to correspond to the AFDG 170.

It is to be noted that the same hash function is used for Kafka®, Spark®, and AFDG.

Hence, an input stream DirectKafkaInputDStream 181 results between the partitions in the Spark® distributed data processing system 110 and the Kafka® distributed messaging platform 150 that is consistent but with no mapping control between the partitions.

Figure 2:
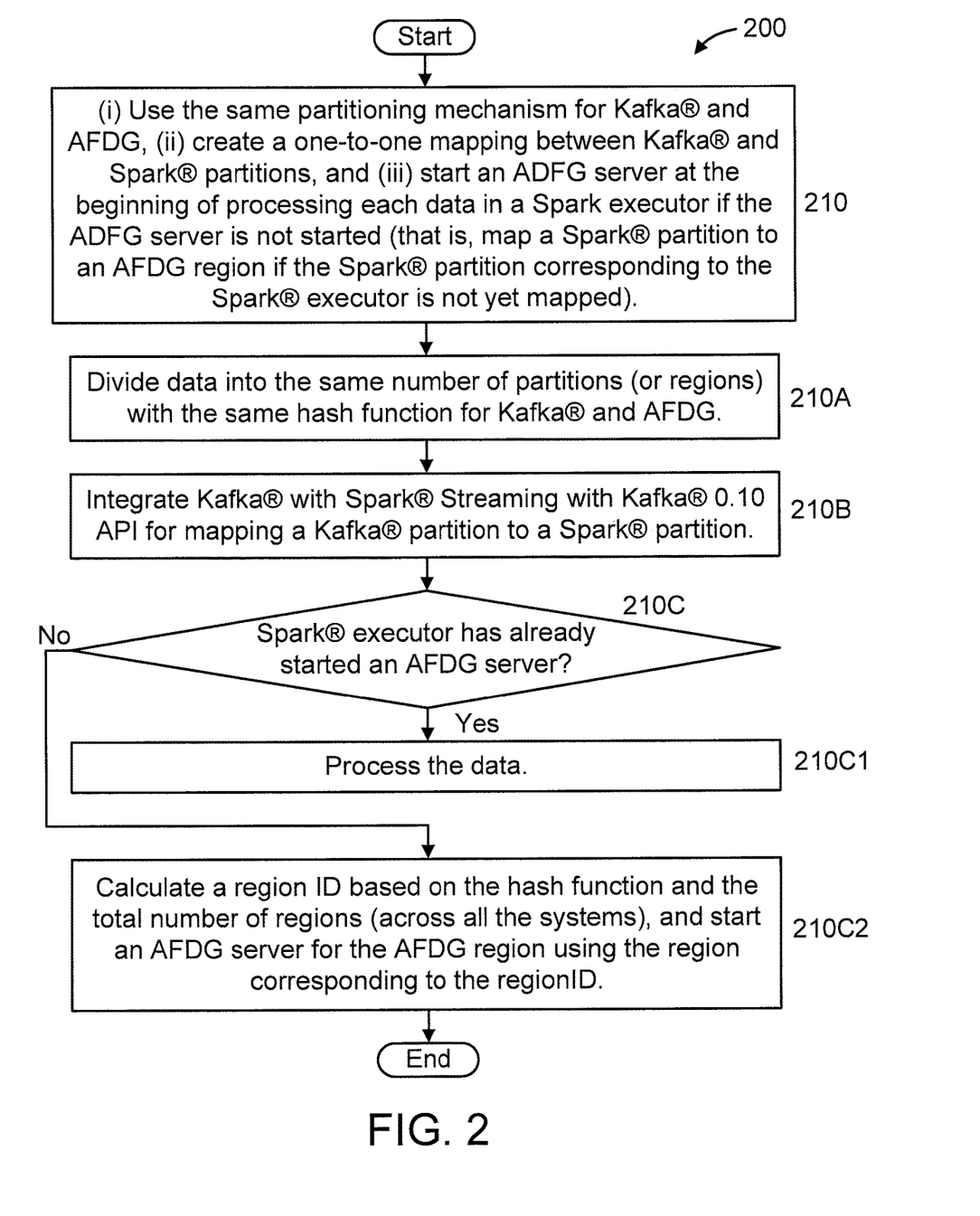
FIG. 2 shows an exemplary method for integrating multiple distributed data processing systems with different data partitioning and routing mechanisms, resource sharing policies, and lifecycles into a single process, in accordance with an embodiment of the present invention.

FIG. 2 shows an exemplary method 200 for integrating multiple distributed data processing systems with different data partitioning and routing mechanisms, resource sharing policies, and lifecycles into a single process, in accordance with an embodiment of the present invention.

At step 210, (i) use the same partitioning mechanism for Kafka® and AFDG, (ii) create a one-to-one mapping between Kafka® and Spark® partitions, and (iii) start an ADFG server at the beginning of processing each data in a Spark executor if the ADFG server is not started (that is, map a Spark® partition to an AFDG region if the Spark® partition corresponding to the Spark® executor is not yet mapped).

In an embodiment, step 210 can include one or more of steps 210A, 210B, and 210C.

At step 210A, divide data into the same number of partitions (or regions) with the same hash function for Kafka® and AFDG.

At step 210B, integrate Kafka® with Spark® Streaming with Kafka® 0.10 API for mapping a Kafka® partition to a Spark® partition. For example, in an embodiment, specify LocationStrategies.PreferConsistent to guarantee the mapping is unchanged.

At step 210C, at the beginning of processing each data in a Spark® executor, determine whether or not the Spark® executor has already started an AFDG server. That is, determine whether or not the Spark® partition corresponding to the Spark® executor is mapped.

If so, then proceed to step 210C1. Otherwise (if not), proceed to step 210C2.

At step 210C1, process the data.

At step 210C2, calculate a region ID based on the hash function and the total number of regions (across all the systems), and start an AFDG server for the AFDG region using the region corresponding to the regionID.

It is to be appreciated that with Kafka® 0.10 API, we can create a one-to-one mapping between Kafka® and Spark® partitions, but the mapping is arbitrary and there is no way to specify the mapping. By starting an ADFG server for an AFDG region (in other words, mapping a Spark® partition to an AFDG region) at the beginning of processing each data in a Spark® executor if it is not started (not mapped), we could make routing for Kafka® partitions and AFDG regions consistent with no mapping information about Kafka® and Spark® partitions.

Figure 3:
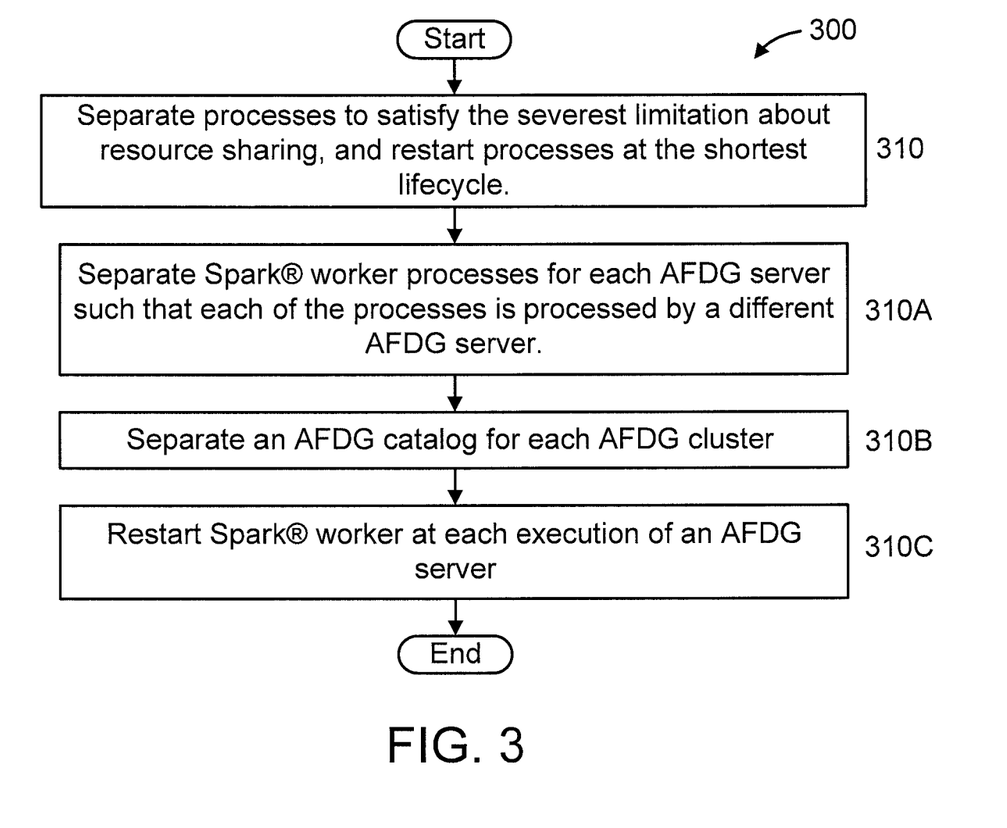
FIG. 3 shows another exemplary method for integrating multiple distributed data processing systems with different data partitioning and routing mechanisms, resource sharing policies, and lifecycles into a single process, in accordance with an embodiment of the present invention.

FIG. 3 shows another exemplary method 300 for integrating multiple distributed data processing systems with different data partitioning and routing mechanisms, resource sharing policies, and lifecycles into a single process, in accordance with an embodiment of the present invention.

At step 310, separate processes to satisfy the severest limitation about resource sharing, and restart processes at the shortest lifecycle.

In an embodiment, step 310 can include one or more of steps 310A, 310B, and 310C.

At step 310A, separate Spark® worker processes for each AFDG server such that each of the processes is processed by a different AFDG server.

In an embodiment, step 310A can be accomplished as follows: set the followings in spark-env.sh (in case of 8 cores and 32 GB per node)
SPARK_WORKER_CORES=1
SPARK_WORKER_MEMORY=4 g
SPARK_WORKER_INSTANCES=8

It is to be appreciated that step 310A solves the problem of multiple AFDG servers being unable to share the same process. It is to be further appreciated that the preceding values are illustrative and depend upon the particular implementation.

At step 310B, separate an AFDG catalog for each AFDG cluster.

It is to be appreciated that step 310B solves the problem of multiple AFDG clusters being unable to share the same AFDG catalog.

At step 310C, restart Spark® worker at each execution of an AFDG server.

In an embodiment, step 310C can be accomplished as follows: restart the entire Spark cluster at each execution of a Spark® job.

It is to be appreciated that step 310C solves the problem of the AFDG server being unable to reuse the same process.

In general, it is to be appreciated that the solutions to the aforementioned problems are essentially devices at the time of operation, and thus have wide applicability.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
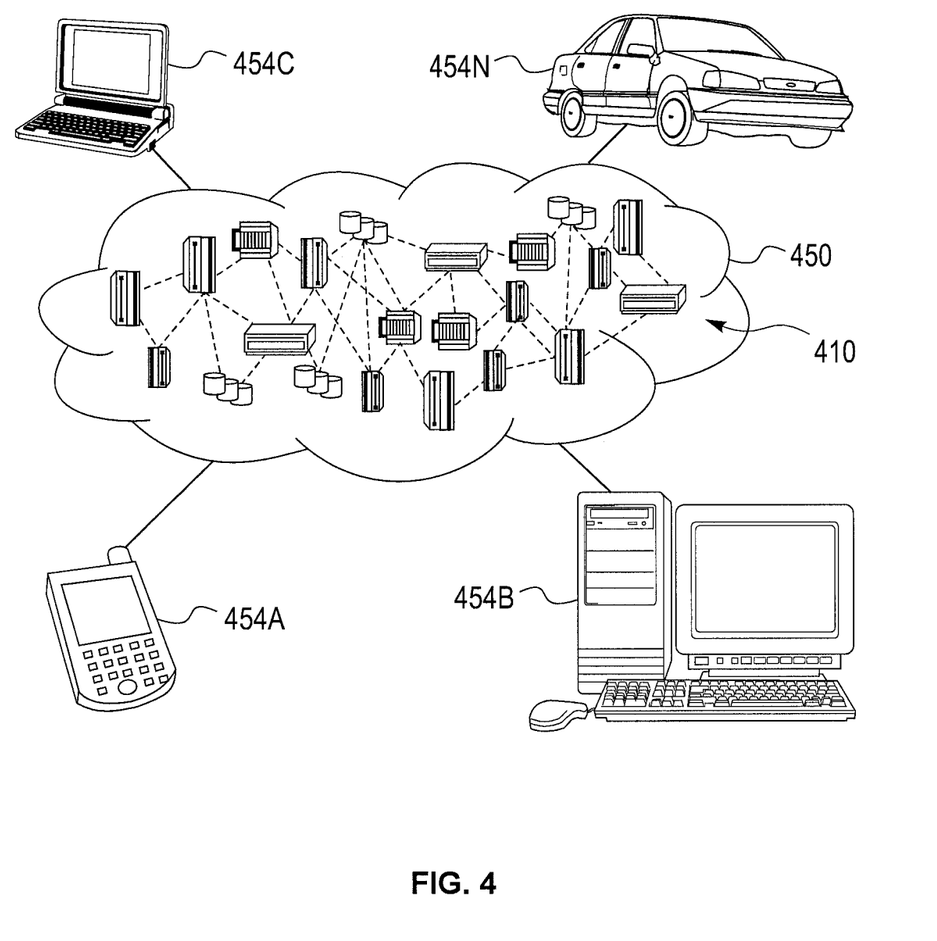
FIG. 4 shows a cloud computing environment, in accordance with an embodiment of the present invention.

Referring now to FIG. 4, illustrative cloud computing environment 450 is depicted. As shown, cloud computing environment 450 includes one or more cloud computing nodes 410 with which local computing devices used by cloud consumers, such as, for example, personal digital assistant (PDA) or cellular telephone 454A, desktop computer 454B, laptop computer 454C, and/or automobile computer system 454N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 4 are intended to be illustrative only and that computing nodes 410 and cloud computing environment 450 can communicate with any type of computerized device over any type of network and/or network addressable connection (e.g., using a web browser).

Figure 5:
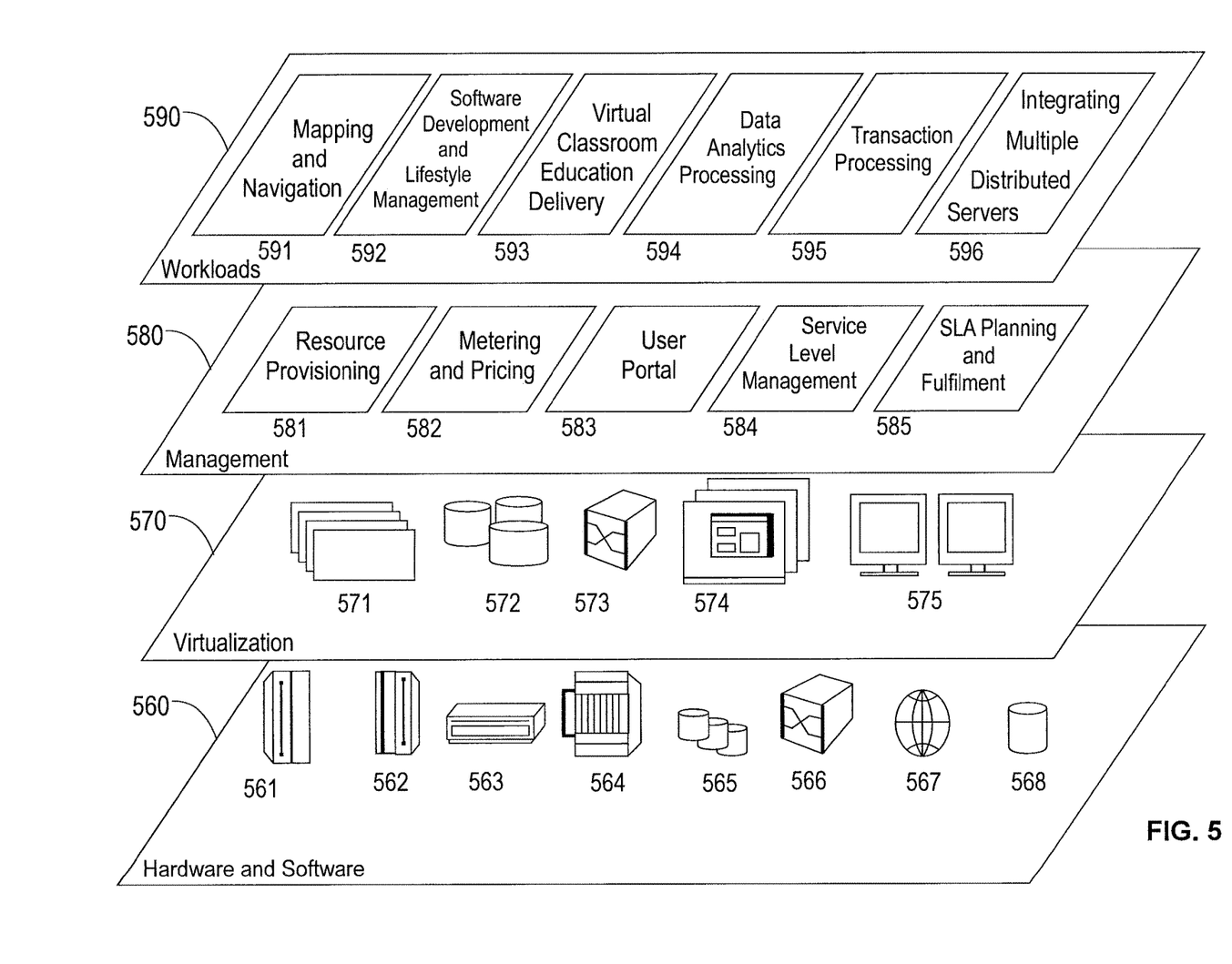
FIG. 5 shows abstraction model layers, in accordance with an embodiment of the present invention.

Referring now to FIG. 5, a set of functional abstraction layers provided by cloud computing environment 450 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; virtual classroom education delivery 593; data analytics processing 594; transaction processing 595; and integrating multiple distributed data processing serves with different data partitioning and routing mechanisms, resource sharing policies and lifecycles into a single process 596.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for enabling consistent data processing by first and second distributed processing systems having different data partitioning and routing mechanisms such that the first distributed processing system is without states and the second distributed processing system is with states, the method comprising:
   dividing data in each of the distributed processing systems into a same number of partitions based on a same key and a same hash function; and
   mapping partitions between the distributed processing systems in a one-to-one mapping,
   wherein said mapping step includes calculating a partition ID based on the hash function and a total number of partitions, and dynamically mapping a partition in the first distributed processing system to a partition in the second distributed processing system, responsive to the partition in the first distributed processing system being unmapped to the partition in the second distributed processing system.

2. The computer-implemented method of claim 1, wherein said dividing step comprises separating processes executed by multiple servers included in the first distributed processing system such that each of the multiple servers only executes a respective one of the separated processes.

3. The computer-implemented method of claim 1, further comprising separating processes processed by multiple servers included in at least one of the distributed processing systems to satisfy a severest one of a plurality of limitations on resource sharing imposed on the at least one of the distributed processing systems.

4. The computer-implemented method of claim 1, wherein the distributed processing systems have different lifecycles, and the method further comprises restarting processes executed by the distributed processing systems at a shortest one of the different lifecycles.

5. The computer-implemented method of claim 1, wherein said mapping step is performed using an application programming interface.

6. The computer-implemented method of claim 1, wherein the second distributed processing system comprises multiple clusters and multiple catalogs, wherein a constraint is imposed on the second distributed processing system such that the multiple clusters are restricted from sharing a same one of the multiple catalogs, and wherein the method further comprises overcoming the constraint by separating the multiple catalogs such that only a respective one of the multiple catalogs is used by each of the multiple clusters.

7. The computer-implemented method of claim 1, wherein the first distributed processing system comprises a cluster having multiple workers, wherein the second distributed processing system comprises at least one server, wherein a constraint is imposed on the second distributed processing system such that the at least one server is restricted from reusing a same process, and wherein the method further comprises overcoming the constraint by restarting the cluster responsive to an execution of a job by any of the workers.

8. The computer-implemented method of claim 1, wherein the first and the second distributed processing systems are configured such that a number of partitions in the first distributed processing system is equal to both a number of partitions in the second distributed processing system and a number of executors in the first distributed processing system.

9. The computer-implemented method of claim 1, wherein the first distributed processing system comprises at least one cluster with a plurality of workers and a plurality of partitions, wherein each of the plurality of workers is restricted to using only a single respective one of the plurality of partitions.

10. The computer-implemented method of claim 1, wherein the partition in the first distributed processing system is fixed but unspecified prior to said mapping step.

11. A computer program product for enabling consistent data processing by first and second distributed processing systems having different data partitioning and routing mechanisms such that the first distributed processing system is without states and the second distributed processing system is with states, the computer program product comprising a non-transitory computer readable storage medium having program instructions embodied therewith, the program instructions executable by a computer to cause the computer to perform a method comprising:
   dividing data in each of the distributed processing systems into a same number of partitions based on a same key and a same hash function; and
   mapping partitions between the distributed processing systems in a one-to-one mapping,
   wherein said mapping step includes calculating a partition ID based on the hash function and a total number of partitions, and dynamically mapping a partition in the first distributed processing system to a partition in the second distributed processing system, responsive to the partition in the first distributed processing system being unmapped to the partition in the second distributed processing system.

12. The computer program product of claim 11, wherein said dividing step comprises separating processes executed by multiple servers included in the first distributed processing system such that each of the multiple servers only executes a respective one of the separated processes.

13. The computer program product of claim 11, wherein the method further comprises separating processes processed by multiple servers included in at least one of the distributed processing systems to satisfy a severest one of a plurality of limitations on resource sharing imposed on the at least one of the distributed processing systems.

14. The computer program product of claim 11, wherein the distributed processing systems have different lifecycles, and the method further comprises restarting processes executed by the distributed processing systems at a shortest one of the different lifecycles.

15. The computer program product of claim 11, wherein said mapping step is performed using an application programming interface.

16. The computer program product of claim 11, wherein the second distributed processing system comprises multiple clusters and multiple catalogs, wherein a constraint is imposed on the second distributed processing system such that the multiple clusters are restricted from sharing a same one of the multiple catalogs, and wherein the method further comprises overcoming the constraint by separating the multiple catalogs such that only a respective one of the multiple catalogs is used by each of the multiple clusters.

17. The computer program product of claim 11, wherein the first distributed processing system comprises a cluster having multiple workers, wherein the second distributed processing system comprises at least one server, wherein a constraint is imposed on the second distributed processing system such that the at least one server is restricted from reusing a same process, and wherein the method further comprises overcoming the constraint by restarting the cluster responsive to an execution of a job by any of the workers.

18. The computer program product of claim 11, wherein the first and the second distributed processing systems are configured such that a number of partitions in the first distributed processing system is equal to both a number of partitions in the second distributed processing system and a number of executors in the first distributed processing system.

19. The computer program product of claim 11, wherein the first distributed processing system comprises at least one cluster with a plurality of workers and a plurality of partitions, wherein each of the plurality of workers is restricted to using only a single respective one of the plurality of partitions.

20. The computer program product of claim 11, wherein the partition in the first distributed processing system is fixed but unspecified prior to said mapping step.

\* \* \* \* \*